Patented July 14, 1931

1,814,148

UNITED STATES PATENT OFFICE

PHILIP H. GROGGINS, OF WASHINGTON, DISTRICT OF COLUMBIA; DEDICATED, BY ASSIGNMENT, TO THE GOVERNMENT AND THE PEOPLE OF THE UNITED STATES OF AMERICA

PROCESS FOR THE PREPARATION OF 4-AMINO-BETA-PHENYL ANTHRAQUINONE BY RING CLOSURE

No Drawing. Application filed August 8, 1929. Serial No. 384,515.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by and for the Government for governmental purposes without payment to me of any royalty thereon.

My invention relates to 4-amino-beta-phenyl-anthraquinone and a process for making the same.

It is the object of my invention to provide a simple and economically practicable method for making 4-amino-beta-phenyl-anthraquinone which is a new and valuble intermediate for the preparation of dyestuffs. Other and further aspects of this invention will be apparent from the disclosures in the specification and appended claims.

I have discovered that 4-amino-para-phenyl-ortho-benzoyl-benzoic acid and its salts which have been described in my copending application Serial No. 384,510, filed August 8, 1929, under certain conditions lose one molecule of water and close the ring to form 4-amino-beta-phenyl-anthraquinone. This reaction is probably best expressed by the following equation:

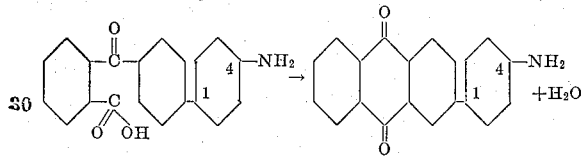

The elimination of water from 4-amino-para-phenyl-ortho-benzoyl-benzoic acid may be brought about by suitable dehydrating agents such as fuming or hydrated sulfuric acid or a mixture of sulfuric acid and boric acid. The fact that this reaction proceeds at all without sulfonation is quite unexpected, since phenyl-anthraquinone or the ortho substituted products can not be made with sulfuric acid alone as a dehydrating agent, as sulfonation simultaneously occurs and a water soluble product is obtained. Other dehydrating agents such as thionyl chloride or phosphorous pentachloride may also be used.

4-amino-beta-phenyl-anthraquinone is a lustrous red product which crystallizes in needles. It gives all the typical reactions of anthraquinone derivatives of this type. The pure product gives a constant melting point of 222° C.

Without limiting my invention to any particular procedure the following examples will serve to illustrate my invention in the preferred form:

*Example I.*—Twenty parts of 4-amino-para-phenyl-ortho-benzoyl-benzoic acid, or the corresponding weight of the amino-sulfate, are dissolved in 100 parts of sulfuric acid (monohydrate) and 10 parts of boric acid. The solution is heated to 125° C. and maintained at this temperature for three hours. The 4-amino-beta-phenyl-anthraquinone may be separated by fractional crystallization by diluting with water to give a residual acidity of 70 per cent $H_2SO_4$ or the reaction product may be poured into 1000 parts of water. The precipitate is filtered and washed free of mineral acid with water, and then washed with dilute alkali. It is then dried at 110° C. The yield is substantially the theoretical. The melting point of the crude product is 218° C. When recrystallized from chlorobenzene it melts at 221.5°–222° C.

*Example II.*—Twenty parts of 4-amino-para-phenyl-ortho-benzoyl-benzoic acid are treated with 60 parts of 23 per cent fuming sulfuric acid at 100° C. for two hours. The reaction mass is poured slowly into one liter of iced water under constant agitation. The precipitated 4-amino-beta-phenyl-anthraquinone is filtered and washed with hot water until free of mineral acid. It is then dried at 110° C.

I am aware that many changes may be made and numerous details of the process may be varied through a wide range without departing from the principles of this invention, and I therefore do not purpose limiting the patent granted hereon, otherwise than necessitated by the the prior art.

I claim as my invention—

1. The process of preparing 4-amino-beta-phenyl-anthraquinone which comprises heating 4-amino-para-phenyl-ortho-benzoyl-benzoic acid at a temperature of about 125° C.

with 95 per cent sulfuric acid as a dehydrating agent.

2. The process of preparing 4-amino-beta-phenyl-anthraquinone which comprises heating 4-amino-para-phenyl-ortho-benzoyl-benzoic acid with a mixture of 95 per cent sulfuric acid and boric acid as a dehydrating agent at a temperature of about 125° C.

3. The process of preparing 4-amino-beta-phenyl-anthraquinone which comprises heating 4-amino-para-phenyl-ortho-benzoyl-benzoic acid with fuming sulfuric acid as a dehydrating agent at a temperature of about 100° C. for a perod of approximately two hours.

4. The process of preparing 4-amino-beta-phenyl-anthraquinone which comprises heating 4-amino-para-phenyl-ortho-benzoyl-benzoic acid with sulfuric acid monohydrate and boric acid at a temperature of about 125° C. for a period of approximately three hours and diluting the reaction mass with water to precipitate out the 4-amino-beta-phenyl-anthraquinone.

In testimony whereof, I have hereunto subscribed my name.

PHILIP H. GROGGINS.